Figure 7:
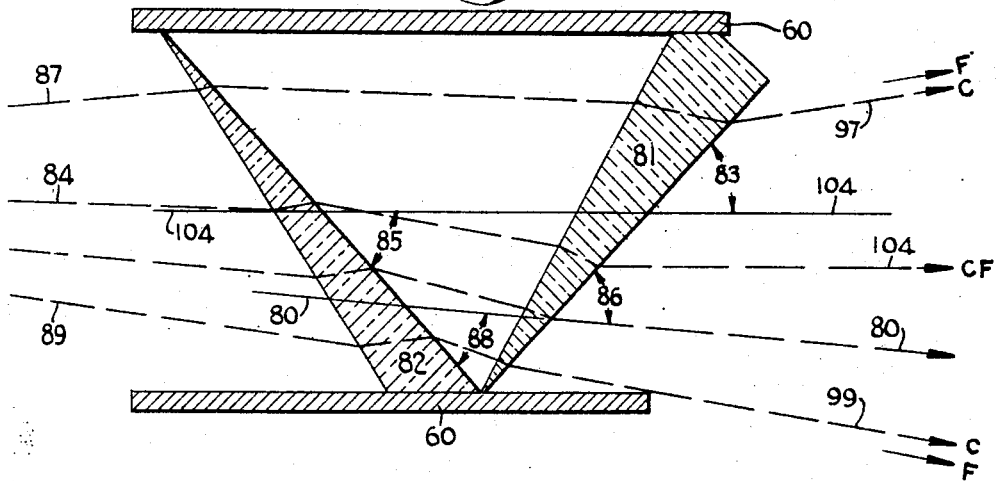

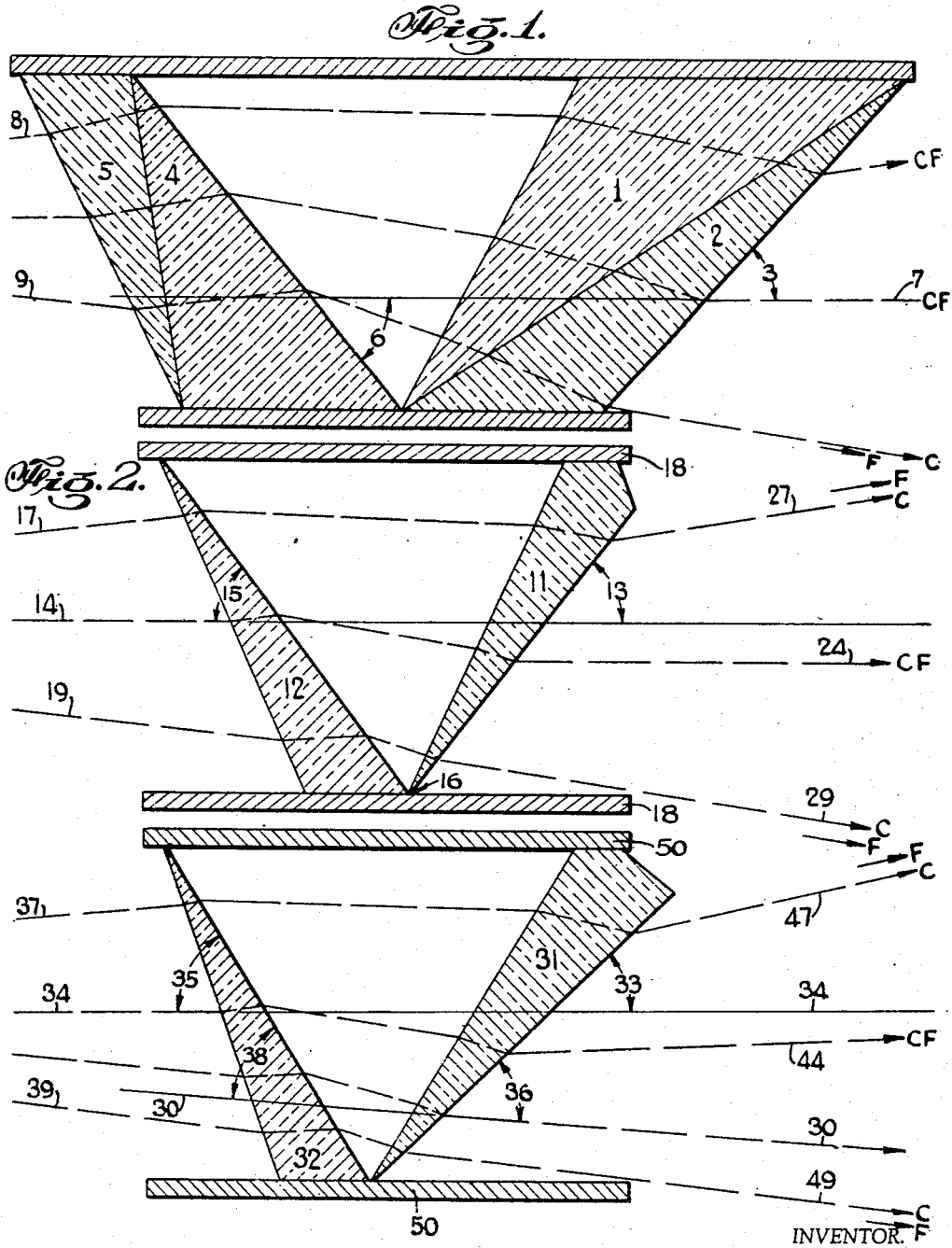
Feb. 21, 1933.  H. S. NEWCOMER  1,898,787
PRISM ANAMORPHOSER
Filed Feb. 25, 1932   3 Sheets-Sheet 1
INVENTOR.
Harry Sidney Newcomer
BY Hammond & Littell
ATTORNEYS

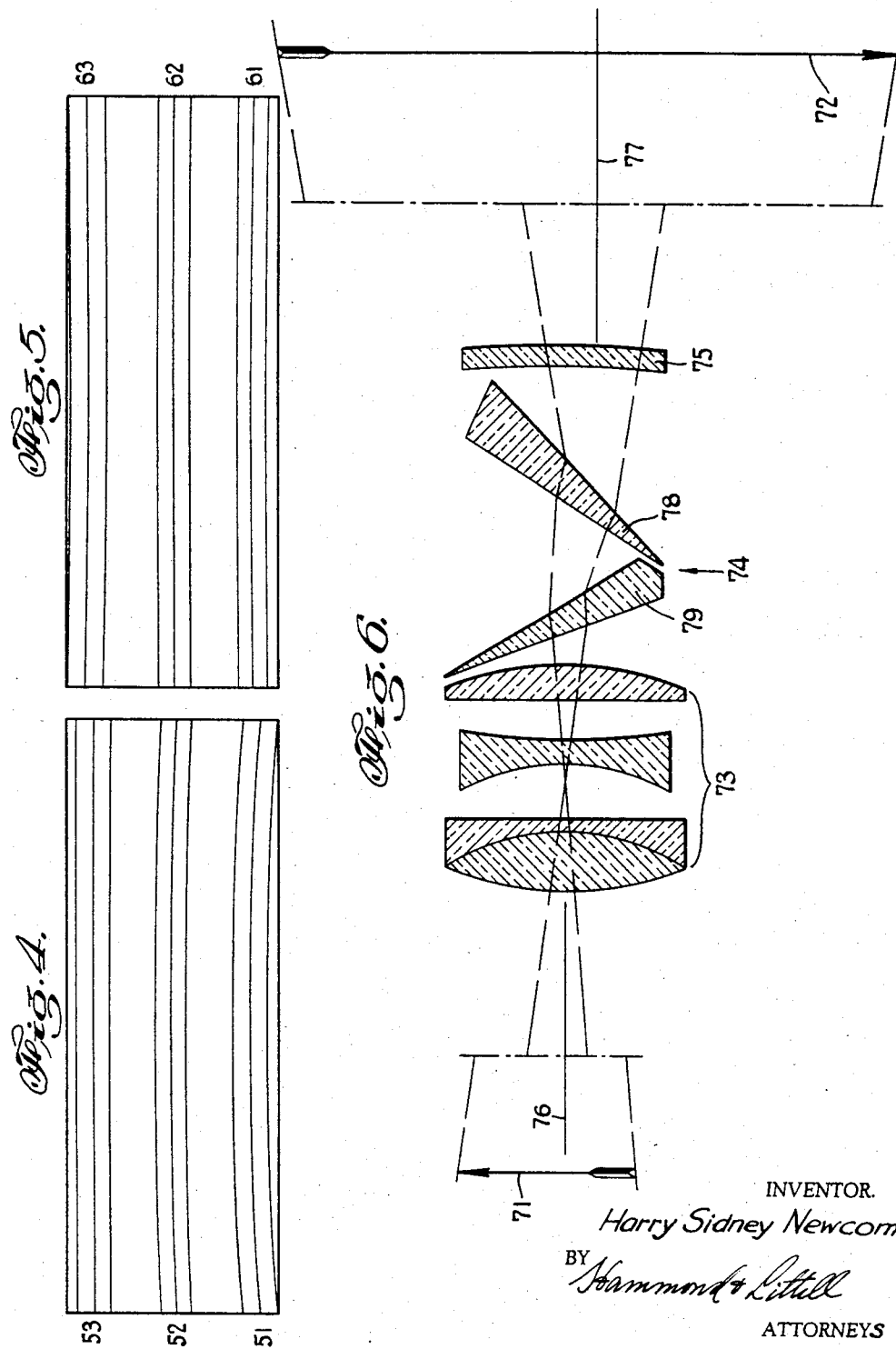

Feb. 21, 1933.  H. S. NEWCOMER  1,898,787
PRISM ANAMORPHOSER
Filed Feb. 25, 1932   3 Sheets-Sheet 3

INVENTOR.
Harry Sidney Newcomer
BY Hammond & Littell
ATTORNEYS

Patented Feb. 21, 1933

1,898,787

UNITED STATES PATENT OFFICE

HARRY SIDNEY NEWCOMER, OF NEW YORK, N. Y.

PRISM ANAMORPHOSER

Application filed February 25, 1932. Serial No. 595,038.

This invention relates to photographic objectives and more particularly to anamorphosing prism objectives of the type used for motion pictures and the projection of printed matter such as stock quotations and financial news.

Anamorphosing prism objectives of this character are used in front of ordinary projection (or photographic) objectives to form an optical system producing images which are magnified (or compressed) more in one diameter than in a diameter perpendicular thereto. Anamorphosing objectives of this character consist in their simplest form of two prisms with their bases oppositely arranged, the median planes of the prisms forming a V. The magnification (or compression) effect of the prism anamorphoser is produced in a plane perpendicular to the two planes of the V. For convenience this plane in which the effect is produced will be called the "active plane" of the anamorphoser.

The general theory of such anamorphosing objectives has been discussed by Rudolph in the British Patent No. 8,512, A. D. 1898. As is there disclosed one of the simplest improvements which can be made in such an objective is to achromatize each member separately, for instance by forming each of the two prisms of a crown and a flint glass prism cemented together.

For certain purposes such a prism anamorphoser may advantageously be designed so that pencils incident upon it parallel to the axis of the optical system exit from the prism anamorphoser still parallel to the axis of the optical system. For convenience a prism anamorphoser so mounted as to produce no angular deviation of pencils incident parallel to the axis of the optical system will be called a "straight vision anamorphosing prism objective". For any anamorphosing prism objective, whether so mounted or not, there is a plane perpendicular to its active plane such that rays incident parallel to said plane exit from the prism objective parallel to said plane. For convenience said plane or any plane parallel thereto may be designated as "an optical axial plane" of the anamorphosing prism objective. It is immaterial that there is an infinity of such planes all parallel to each other.

Anamorphosing prism objectives, whether straight vision or not, produce a variation in the expansion (or compression) of pencils lying in the active plane as their angle of inclination to the axis or the optical axial plane of the objective varies.

Anamorphosing prism objectives have heretofore given an assymmetrical distribution of this variation in magnification or expansion for variation in the angle of inclination of oppositely but equally inclined pencils. Such asymmetrical expansion (or compression) produces unequal magnification (or compression) of marginal portions of the image symmetrically disposed in the active plane.

In a copending application for Letters Patent, Serial No. 382,681, filed August 1, 1929, the present applicant disclosed an anamorphosing prism objective corrected for asymmetrical distortion of this character, the word "distortion" being used in the sense of reproduction without a linear algebraic relationship between object and image, and not in the sense of different magnification in two diameters as the word is sometimes used in speaking of anamorphosing systems.

For convenience an anamorphosing prism objective which is corrected so that two rays incident on the objective and lying in an active plane and making equal but opposite substantial angles with an axis, mechanical or otherwise, of the optical system exit from the objective at substantially equal but opposite angles with this axis will be called an "equilateral anamorphosing prism objective" with respect to this axis. This axis can be known as the "equilateral axis" of the anamorphosing prism objective. If the equilateral axis substantially coincides with the optical axial plane the objective may be designated as an "equilateral anamorphosing straight vision prism objective."

When corrected for the above type of distortion, and also if not so corrected, anamorphosing prism objectives may still be responsible for images distorted in other respects.

Thus straight lines in the plane of the object and perpendicular to the active plane may, because of the action of the prism anamorphoser, be imaged as curved lines. This bending of the images of straight lines oriented perpendicular to the active plane may occur in all regions of the image but, for instance in a projected expanded screen image, as produced by an optical system comprising in part an equilateral anamorphosing straight vision prism objective, it is most pronounced at that margin of the projected expanded screen image which is on the same side as the angle of the V of the prism objective.

Although this distortion or bending of straight lines perpendicular to the active plane is asymmetrical it nevertheless resembles and will be called for convenience "pillow case distortion."

This invention has for its principal objects the reduction or correction of this pillow case distortion produced by anamorphosing prism objectives and the color correction of anamorphosing prism objectives.

The invention has for a further object to provide an objective which while incorporating the desired corrections is of simple design and can be economically produced.

Figure 8:
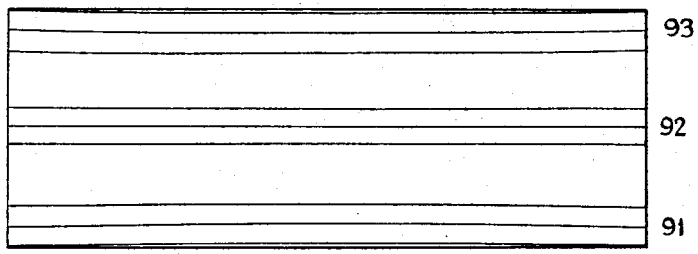

The nature and objects of the invention will be better understood from a description of selected illustrative embodiments thereof, for the purpose of which description reference should be had to the accompanying drawings forming a part hereof and in which:

Figure 1 is a diagrammatic representation in longitudinal section of an achromatic equilateral anamorphosing straight vision prism objective embodying certain features of the invention, Figure 2 is a diagrammatic representation in longitudinal section of another achromatic equilateral anamorphosing straight vision prism objective also embodying features of the invention, Figure 3 is a diagrammatic representation in longitudinal section of an achromatic anamorphosing prism objective embodying features of the invention, Figure 4 is a diagrammatic representation of a screen image produced when using the prism objective of Figure 2 in connection with an optical system such for example as indicated in Figure 6, Figure 5 is a diagrammatic representation of a screen image produced when using the prism objective of Figure 3 or more specifically the objective and optical systems of Figure 6, Figure 6 is a schematic representation in longitudinal section of a complete optical system of which an anamorphosing prism objective embodying certain features of the invention is a part, Figure 7 is a diagrammatic representation in longitudinal section of an achromatic equilateral anamorphosing prism objective embodying features of the invention, and, Figure 8 is a diagrammatic representation of a screen image produced when using the prism objective of Figure 7, in connection with the optical system 73.75 of Figure 6.

In Figure 1. I have shown diagrammatically, by way of example, an achromatic anamorphosing prism objective comprising two achromatized prisms 1,2 and 4,5. The prism 1,2 is composed of a crown glass 1 and a flint glass 2. The front face of the prism 1,2 makes an angle 3 with an optical axial plane 7 of the objective. The prism 4,5 is composed of a crown glass 4 and a flint glass 5. The front face of the prism 4,5 makes an angle 6 with an optical axial plane 7 of the objective. At 8 and 9 I have shown rays inclined $6\frac{1}{2}°$ to the axis, up and down respectively. The residual dispersions and the direction thereof, of the exiting rays is indicated by arrows and letters C and F and their relative positions.

In Figure 2 I have shown diagrammatically, by way of example, an anamorphosing prism objective comprising two prisms 11,12 of different strengths and different glasses, the prism 11 at the front or expansion end of the objective having its front face set at an angle 13 with the axis 14 of the objective and the prism 12 having its front face set at an angle 15 with the axis of the objective. The prisms 11,12 have their bases oppositely arranged. The prisms meet in the form of a V whose angle is at 16. At 18,18 I have shown diagrammatically a mounting for the objective, parallel by definition to the axis 14. At 14 I have shown an axial ray exiting from the objective at its other end as the ray 24, parallel to the axis of the objective. At 17 and 19 I have shown rays inclined $6\frac{1}{2}°$ to the axis, up and down respectively and exiting from the objective at its other end as the rays 27 and 29 respectively. The residual dispersion, and the direction thereof, of the exiting rays is indicated by arrows and letters C and F and their relative positions.

In Figure 3 I have shown diagrammatically an anamorphosing prism objective comprising two prisms 31,32 of different strengths and different glasses, the prism 31 at the front or expansion end of the objective having its front face set at an angle 33 with the axis 34 of the mounting of the objective and at an angle 36 with an optical axial plane 30 of the objective, the prism 32 having its front face set at an angle 35 with the axis 34 of the mounting of the objective and at an angle 38 with the optical axial plane 30 of the objective. The prisms have their bases oppositely arranged. At 50 I have shown diagrammatically a mounting for the objective set at an angle of 5° with the optical axial plane 30 and parallel by definition to the axis 34 of the objective and of the rest of the optical system with which it is designed to be associated. At 34 I have shown an axial ray exiting from the objective at its other end as the ray 44 and no longer parallel to the axis 34. At 37 and 39 I have shown rays inclined $6\frac{1}{2}°$ up and down respectively, to the axis 34 of the objective and exiting from the objective at its other end as the rays 47 and 49 respectively. The residual dispersion, and the direction thereof, of the exiting rays is indicated by the arrows and letters C and F and their relative positions.

In Figure 4 I have shown schematically the projected expanded screen image of a plane object consisting of a series of equidistant parallel lines, the image being such as might be produced by the achromatic equilateral anamorphosing straight vision prism objective of Figure 2, oriented with its active plane perpendicular to the lines, in combination with a suitable spherical projection lens and a suitable correcting spherical lens. The figure illustrates, by way of example, a screen image wherein the expansion due to the anamorphoser is a little less than 45% more than that in the inactive plane and wherein the semi-angular height (expanded) in the active plane is a little more than 9° and the semi-angular width of the projection field is a little more than 23°. The expansion of the marginal lines 51 and 53 is equal but greater than that of the central lines 52. In addition the marginal lines 51 of the projected expanded screen image are curved away from the lines 52 at their ends because of the pillow case distortion produced by the objective of Figure 2. The lines 51 of the screen image lie on the same side of the axis of the projection system as the angle of the V of the prism objective as shown at 16 in Figure 2. In this schematic representation the distortions ordinarily produced by such prism objectives are exaggerated somewhat in order to clarify the subject. This exaggeration particularly applies to the inequality in expansion. The latter in practice is scarcely observable in the case of an equilateral straight vision anamorphosing prism objective, embodying the improvements outlined in my copending application Serial No. 382,681 above mentioned.

In Figure 5 I have shown schematically a similarly produced image using the prism objective of the type illustrated in Figure 3 instead of that of Figure 2. More specifically it is the front view of the image in the plane at 72 of Figure 6 there shown in section at the position of the arrow. At 62 I have shown the lines imaged by pencils which exit parallel to the optical axis of the system, 77 Figure 6, and those adjacent thereto on the expansion side of the prism objective. At 61, I have shown lines imaged on the same side of the axis of the projection system as the angle of the V of the prism objective, and toward the margin indicated at 72 in Figure 6 by the point of the arrow, and at 63 I have shown the lines imaged at the opposite margin of the picture. The figure would be substantially the same if it were considered as due to pencils symmetrically placed with respect to the axis 76, Figure 6, on the compression side of the prism objective. The lines 63 are spaced slightly further apart than the lines 61 and they are further distant from the lines 62. The lines 61 are appreciably straighter than the lines 51 of Figure 4.

With relatively slight variations in the optical system, the lines 52, of Figure 4, might have been nearly straight instead of curved as drawn. The lines 52 if curved bend toward the lines 51 at their ends. The lines 53 might curve in either direction depending upon the amount of curvature of the lines 51 and the angular width of the field across the series of lines.

In Figure 6, I have shown schematically, by way of example only, a longitudinal section of an optical system of which an equilateral anamorphosing prism objective of the type indicated in Figure 3 forms a part. At 71 I have shown in section an object imaged by the optical system at 72 (or vice versa). The distance from the optical system to 72 is for convenience in representation foreshortened from the distances usually obtaining in practice. Both 71 and 72 are approximated to the objectives by breaking the drawing.

At 73 I have shown a corrected spherical projection (or photographic) objective so placed with respect to the object 71 as to image the object at infinity. At 74 I have shown an achromatic equilateral anamorphosing prism objective producing an expansion of the image in the plane of the paper of about 45%. At 75 there is placed a so-called spherical correcting lens of a suitable form so as to obviate the introduction of astigmatism in rays inclined to the axis of the system and of a focal length equal to the screen (or object) distance 75 to 72, thus ensuring parallelism of the rays constituting pencils traversing the prisms. The projected image 72 is magnified by virtue of the action of the anamorphoser about 45% more in the plane of the paper (the active plane) than the magnification obtaining in the plane perpendicular thereto. The prism anamorphoser 74 is not a straight vision prism objective. It has substantially the characteristics of the relatively distortionless prism objective of Figure 3. At 76 I have indicated the axis of the mounting of the prism objective. This is at the same time the axis of the optical system as a whole, but does not coincide with the optical axial plane of this particular objective 74.

In Figure 7 I have shown diagrammatically an anamorphosing prism objective comprising two prisms 81, 82 of different strengths and different glasses, the prism 81 at the front or expansion end of the objective having its front face set at an angle 83 with the axis 104 of the mounting of the objective and at an angle 86 with an optical axial plane 80 of the objective, the prism 82 having its front face set at an angle 85 with the axis 104 of the mounting of the objective and at an angle 88 with the optical axial plane 80 of the objective. The prisms have their bases oppositely arranged. At 60 I have shown diagrammatically a mounting for the objective set at an angle of about 5° with the optical axial plane 80 and parallel by definition to the axis 104 of the objective and of the rest of the optical system with which it is designed to be associated. At 84 I have shown a ray exiting from the objective at its other, expansion, end as the ray 94 parallel to the axis 104. At 87 and 89 I have shown rays inclined 6½° up and 6.462° down respectively, to the ray 84 and exiting from the objective at its other end as the rays 97 and 99. The residual dispersion and the direction thereof, of the exiting rays is indicated by the arrows and the letters C and F and their relative positions.

In Figure 8 I have shown schematically the projected expanded screen image of a plane object consisting of a series of equidistant parallel lines, the image being such as might be produced by the achromatic equilateral anamorphosing prism objective with angularly displaced optical axial plane as illustrated in Figure 7 oriented with its active plane perpendicular to the lines, in combination with a suitable spherical projection lens and correcting spherical lens, such as are illustrated at 73 and 75, Figure 6. The figure illustrates, by way of example, a screen image wherein the expansion due to the anamorphoser is a little less than 45% more than that in the inactive plane and wherein the semi-angular height (expanded) in the active plane is a little more than 9° and the semi-angular width of the projection field is a little more than 23°. The expansion of the marginal lines 91 and 93 is equal but greater than that of the central lines 92. In addition the marginal lines 91 and/or 93 of the projected expanded screen image are curved away from the lines 92 at their ends. The lines 91 are appreciably straighter than the lines 51 of Figure 4. The curvature of the lines 91 and 93 is more or less equal and symmetrical with respect to the center lines. The lines 92 are imaged by pencils which exit parallel to the optical axis of the system, 77 Figure 6, and those adjacent thereto on the expansion side of the prism objective. The prism anamorphoser might have been designed with equal propriety to give the same figure for pencils symmetrically placed with respect to the axis 76, Figure 6, on the compression side of the prism objective. The necessary changes in design are slight and are apparent from the disclosure hereinafter set forth.

It is not necessary, in using a non-straight vision anamorphoser, that either the object field or the image field be selected so as to be symmetrically placed with respect to the axis 76. Either the one or the other may be roughly so selected or the angular displacement divided between the two fields. In the arrangement illustrated in Figure 6 the utilized portion of the image field 72 is approximately symmetrically placed with respect to an axis 77, itself laterally displaced somewhat with respect to the axis 76 of the optical system proper but nevertheless parallel thereto. This lateral displacement of the imagery is an inherent characteristic of a prism anamorphoser with which we are not here concerned and is not the same as the angular displacement of the imagery obtaining when a non-straight vision anamorphoser is used. It is immaterial in many respects which side is subjected to the angular displacement. The arrangement shown is one of the suitable alternatives and the basis on which the images depicted in Figures 5 and 8 are drawn. Figure 5 is the front view of a symmetrically placed image 72, the lines 61, 62, 63 of Figure 5, being perpendicular to the paper in a plane passing through the image position indicated at 72. Figure 8 is the same except that the image produced by the prism anamorphoser, Figure 7, used is equilateral with respect to the axis 77 when the object 71, displaced as it is with respect to the axis 76, is nevertheless symmetrical with respect to the central ray 84, Figure 7.

In a copending application for Letters Patent, Ser. No. 382,681 filed August 1, 1929, the present applicant disclosed an anamorphosing straight vision prism objective having the "equilateral" property hereinbefore defined. Anamorphosing prism objectives as constructed prior to the invention described in said application were not equilateral but applicant discovered that by maintaining certain relations between the characteristics and positions of the two prisms the equilateral quality of straight vision anamorphosing prism objectives could be attained. The optimum conditions will be better understood from a consideration of the principles set forth in the following paragraph. They apply whether the anamorphoser be achromatized by separate achromatization of each of the prisms as in Figure 1 or by cross achromatization using simple prisms of specially chosen glasses as in Figures 2, 3, 6 and 7.

A certain relationship between the angles of inclination of the prisms and their strength must obtain. The strength of a prism will in this specification, be defined as the minimum deviation angle ω for the $d$ ray. In the case of a simple prism this may readily be calculated from the expression $$\sin \frac{\omega + \sigma}{2} = \eta \sin \frac{\sigma}{2}$$

where $\sigma$ is the apex angle and $\eta$ the index of refraction. Provided that the expansion to be produced by the objective is fixed, the appropriate angle of inclination to the axis of the front face of the prism at the front or expansion end of the objective is fairly constant. The optimum angle increases a little with increase in the strength of the prisms and vice versa. It decreases with increase in the amount of expansion to be produced by the objective. The angle may be allowed to vary two or three degrees either way from its optimum magnitude without introducing an amount of asymmetry in the expansion which is objectionable for most purposes. Within these limits each degree of variation from the optimum causes a deviation difference of about 0.03° in rays inclined respectively upward and downward at 9° to the axis at the expansion end in the case of objectives such as illustrated herein. The appropriate angle of inclination to the axis of the front face of the back prism decreases with increase in the amount of expansion to be produced by the objective, the decrease being about two thirds the corresponding decrease in the angle to the axis of the front prism. If the index of refraction of the glass of this prism is unchanged the angle increases roughly degree for degree with increase in the apex angle of the prism. Assuming that the strength and orientation of the prism at the back or compression end of the objective has been provisionally chosen, then for any strength of the front prism there will be an angle of inclination for it such that axial rays remain parallel to the axis after traversing the prism objective. But in general any two rays incident upon the objective, lying in an active plane, and making equal but opposite angles with the axis of such a straight vision objective will be deviated by different amounts; the objective will not be an "equilateral" anamorphoser. I have discovered that the deviations can be made substantially equal and hence the expansion in the active plane symmetrical with respect to the axis of the objective, now also an optical axial plane of the objective, by imposing certain restrictions on the relative strengths and inclinations of the two prisms. The front prism must be stronger, but not more than 25% stronger, than the back prism and the front face of the latter prism must be inclined to the axis, optical axial plane, of the objective at an angle greater but not more than twelve degrees greater, than the angle of inclination of the front face of the front prism to the axis, optical axial plane, of the objective. Objectives comprising relatively weak prisms have the setting angles of the prisms more nearly equal and certain ones may even have the back angle slightly less than the front angle. Objectives in which there is more than 12° difference in these angles show either a considerable pillow case distortion of the image fields or else an appreciable inequality in expansion in the two halves of the image field. A limitation of the difference to 8 or 9° appreciably restricts the two types of distortion. The exact orientation angle and strength of the front prism corresponding to a suitable orientation and strength of the back prism will be determined by trigonometric calculation and interpolation, approximate figures for all of the construction characteristics of an objective being available in the data for the illustrative embodiments of the invention herein set forth and modifications thereof made in the manner and degree above indicated. In the process of interpolation, when the data of a straight vision prism anamorphoser of nearly suitable character is being finally adjusted to provide an equilateral straight vision prism anamorphoser of desired character by changing the angle of inclination of the front prism the straight vision characteristic will be retained by increasing the apex angle of the front prism by roughly 0.02° for every 0.1° increase in the angle of inclination of the front face of this prism to the axis of the objective.

An equilateral straight vision anamorphosing prism objective will, I have discovered, remain substantially equilateral and straight vision when the back and front prisms are rotated apart (or together) about an axis perpendicular to the active plane and situated at the angle of the V of the anamorphoser, provided the ratio of the angles of rotation of the back and front prisms is substantially as 5 is to 7.2; that is about half again as much angular movement for the front prism as for the back prism. This rotation of the two prisms, when apart increases, when together decreases the magnification produced by the objective in its active plane.

I have discovered that a nearly perfect achromatization of an equilateral straight vision prism anamorphoser can be obtained by achromatizing each prism separately in the manner and arrangement shown schematically in the illustrative example, Figure 1, where each prism is individually achromatized for rays parallel to the optical axial plane of the objective when on the side of the prism exterior to the objective, and where the flint glass member of the achromatized prism is in each case on the side of the prism exterior to the anamorphosing objective, the positions 2 and 5 of Figure 1. If in the process of designing a certain anamorphosing prism objective the strength of one of the prisms which are to compose it and the angle of inclination of its front face to the optical axial plane have been chosen, then keeping these angles constant one can, while varying the relative strengths of the crown and flint glass prisms which cemented together make the said prism, arrive by interpolation at a cemented pair which will produce equal angular deviations of two rays of different colors for which the objective is being achromatized when said rays are incident on the exterior face of the said prism parallel to the optical axial plane of the anamorphoser being constructed. A similar procedure is then repeated for the other prism of the anamorphoser, care being taken of course that the angles of inclination of the front face of the prism to the optical axial plane and the strength of the prism is such that the ray parallel to the optical axial plane exteriorly is parallel internally to the previously calculated ray of the other prism. The measures necessary to establish at the same time the "equilateral" character of the objective have already been discussed.

If for example, such an equilateral straight vision prism anamorphoser as just described, has been designed so as to secure coincidence of the $d$ and $g$ rays for axial pencils passing through the objective, then there will remain for such pencils a secondary spectrum of about 0.003° for the interval C to $h$, pairs of axial rays symmetrically placed in the spectrum with respect to and exterior to $d$ and $g$ exiting at approximately equal but slightly different angles than the pair $d\ g$.

The correction thus made relates to rays parallel to the optical axial plane of the objective. Rays entering the objective at its compression end making a substantial angle with the axial plane, and directed away from the angle of the V of the objective, up, 8 in Figure 1, show less secondary spectrum. The secondary spectrum for such rays is appreciably less than .001° when the inclination of the ray to the optical axial plane at the compression end is about 6½°. Rays oppositely directed, down, 9 in Figure 1, show more color dispersion, as much as 0.011° for the spectrum C to F or $h$ at 6½°. This maximum dispersion can be appreciably decreased by introducing a slight increase of suitable character in the dispersion along axial rays. Rays directed away from the V of the objective, up, will then also show an increased dispersion.

I have discovered that if the objective color corrected for axial pencils in the manner first described, be tipped about 5° in the manner to be later described, then the range of dispersions for varying inclinations to the new mechanical axis and up to 6½° to either side at the compression end becomes more equally distributed and has a maximum value of about 0.006°, C to F or $h$. This objective in addition to its high degree of color correction then also has a certain freedom from distortion to be described later.

The good color correction for the oblique rays is obtained in fact by virtue of the arrangement of both flint glass members on the side of the respective prism exterior to the anamorphosing objective as contrasted with prior practice in which the separate prisms of the anamorphoser have been achromatized by placing at least one flint glass member on the inside of the anamorphoser.

By way of example construction data for this equilateral achromatic straight vision prism anamorphoser in its untipped position are as follows:

| | Apex angle | Angle between front face and optical axial plane | Glass |
|---|---|---|---|
| Prism 2 | 14.02° | 46.915° | flint. |
| Prism 1 | 28.45° | | crown. |
| Prism 4 | 30.90° | 50.50° | crown. |
| Prism 5 | 17.99° | | flint. |

Crown glass $n_d$ 1.5400, $\nu$59.6
Flint glass $n_d$ 1.6034, $\nu$38.0

The particular crown and flint glasses here chosen have practically identical expansion coefficients, namely 842 and 841 respectively. This is an advantage if the prisms are to be subjected to considerable temperature changes as for instance in projection. This choice of crown and flint glasses having equal expansion coefficients determined the choice of these glasses and indeed limited the choice to relatively few pairs, consideration being given at the same time to the desirability of glasses having sufficiently different Abbe numbers $\nu$ so that the angles of the individual prisms could be reasonably small.

If the front prism had had the crown glass on the outside the cemented surface would have been much less oblique to the traversing rays. The achromatism for inclined rays would not have been as satisfactory but where the prism makes a small angle with the axis and the crown and flint glasses composing it have appreciably different indices the decrease in light loss at the cemented surface might be desirable.

In order to make prism objectives reasonably compact and reduce the weight and cost it is desirable to achromatize the objective by some other method than the usual one of the separate achromatization of each prism by compounding it of a crown and flint prism cemented together.

For the sake of convenience in this specification we will hereafter measure the dispersion or chromatic effect along any ray as equal to the angular difference in thousandths of a degree between the C and F rays. The correction along any ray will be treated as perfect when this difference is zero. As a matter of fact I have discovered that the method of achromatization of such pairs of prisms which is to be described below, when it brings coincidence of the C and F rays, also makes all other rays in the interval C to h coincident to within one or two thousandths of a degree. It is therefore not necessary to consider any other pair of rays when undertaking achromatization, although other suitably spaced pairs in the spectrum could be used with propriety. When the C and F rays are made to coincide along a ray directed at any particular inclination, zero degrees or otherwise, to the axis then rays oppositely directed with respect to but making equal angles with this ray will show increasing but opposite dispersions as the angles increase. The dispersion C to F will increase about 0.007 degrees for each degree variation in inclination at the compression end. The amount of dispersion, as a function of color, will be greater, the greater the spectral interval considered.

In the case of an equilateral straight vision prism anamorphoser I have discovered that this color correction for axial pencils, can be attained by making the prism at the compression or back end of the objective of a crown glass having a relatively large constringence or Abbe number, preferably greater than 55, (for instance in the example of Figure 2 the constringence of the prism 12 is 63.9 and the index of refraction is 1.5163) and choosing a smaller constringence for the front prism. (For instance in the example of Figure 2 the constringence of the prism 11 is 55.9 and the index of refraction is 1.5699.) The indices of refraction of these prisms, as far as the color correction is concerned, are relatively unimportant. I have discovered that when in the case of the prism anamorphoser magnifying about 45% the constringence or Abbe number, $\nu$, of the front prism, 11 Figure 2, is approximately nine units less than that of the other or back prism, 12 Figure 2, there will be nearly zero dispersion, the C and F rays will coincide along an optical axial plane of the objective. The dispersion will differ from zero by about 0.0035° for every unit change in this $\nu$ difference from the optimum difference. A dispersion of 0.0035° is not at all noticeable in projection but ten times this amount, even when seen only at the margin of the picture is noticeable. Appreciably larger amounts will usually be objectionable even when critical definition is not required.

The amount of the $\nu$ difference necessary to achromatize the anamorphoser along an optical axial plane decreases proportionately with decrease in magnification being zero at zero magnification. The difference is thus about one unit for every 5% of magnification. It also varies slightly in proportion to the strength of the prisms comprising an anamorphoser of any given magnification constant. For straight vision equilateral anamorphosers producing magnification of 45% ( magnification ratio 1.45 to 1) as here illustrated the $\nu$ difference necessary to achromatize the anamorphoser along the optical axial plane is approximately equal to 6.6 plus one third the number of degrees minimum deviation angle of the back prism.

The amount of the dispersion when it is zero along the optical axial plane, increases with increasing angles, in either direction, of the ray to the plane. It is of opposite character in the two directions. The amount of the increase for every degree change in inclination of the pencil at the compression end of the objective is about twice that due to unit constringence difference variation mentioned above. The increment of chromatic difference per degree of inclination difference is approximately equal to 0.00075° for every 5% of magnification produced by the anamorphoser.

If the dispersion is not approximately zero along the axis of the objective it will be greater at one margin of the picture than at the other and therefore unnecessarily large at that margin. In addition the definition at the center of the picture, because of color fringes, will be less good than it might be. There will be occasions when, because one margin of the picture is subject to closer scrutiny than the other margin, or for other reasons, it will be desirable to have a somewhat asymmetrical correction.

For a straight vision anamorphosing prism objective magnifying 45% (45% more in the active plane) the practical limits within which suitable color corrections may be obtained are not exceeded when the prism at the expansion or front end of the objective is made from a glass having a constringence number at least 4 and not more than 14 units less than the constringence number of the glass of the other or back prism. Such differences are much less than the differences between the constringences or reciprocal dispersions of crowns and flints ordinarily used for achromatization purposes. Such limits fix, for rays inclined 6½° to the optical axial plane dispersion limits C to F less than about 0.07° absolute and when there exists such a maximum dispersion in one direction it is somewhat less than half as much in the other direction.

Other considerations as to fundamental details of design of equilateral straight vision prism anamorphosers have been set forth above.

The constants of the equilateral straight vision anamorphosing prism objective shown in Figure 2 are as follows:

|  | Apex angle | Angle between front face and optical axial plane |
|---|---|---|
| Prism-11 | 13.47° | 50.93° |
| Prism-12 | 13° | 53° |

Prism 11 glass $n_d$ 1.5699, $\nu$55.9
Prism 12 glass $n_d$ 1.5163, $\nu$63.9

This prism anamorphoser is, to be exact, not strictly equilateral, the angle 50.93° being somewhat large. The actual inclinations up and down at the expansion end of rays inclined 6½° at the compression end are 9.086° and 9.168° respectively (C rays). For absolute equality the construction angles 50.93 and 53 should be changed to differ by about 5°, the two prisms strengths being made at the same time slightly more equal in the manner indicated above if the straight vision characteristic is to be retained.

Equilateral straight vision anamorphosing prism objectives achromatized as above show in general a pillow case distortion of projected expanded images. Figure 4 illustrates such distortion. The distortion can perhaps be somewhat reduced by choosing the index of refraction of the back prism (at the compression end) as large as possible consistent with the requirements as to suitable constringencies for achromatization. In Figure 3 the back prism 32 has an index of 1.5891 and a constringence number of 61.2. Its front face is set at an angle 38 with an optical axial plane of the objective, which angle is larger than the angle 15 which a similar face of the prism 12, Figure 2, makes with an optical axial plane, the magnification constants of the two equilateral anamorphosing objectives being approximately the same. The angles between the back faces of the back prisms and the optical axial planes are not materially different in the two cases, in fact in the examples they are identical.

If the equilateral anamorphosing prism objective shown in Figure 3 had been mounted as a straight vision prism anamorphoser then it would have been desirable to choose the constringence number of the glass of the front prism 31 about equal to 52 (or at least between the limits 57 to 47). If the prism 31 were composed of a glass whose constringence number were 52.4 then the dispersions along rays corresponding to the rays 27, 24 and 29 of Figure 2 would be 0.048°, 0.001°, 0.054° respectively. In the example of Figure 2 the dispersions are 0.040°, 0.0027°, 0.050° respectively.

I have discovered that the pillow case distortion of the expanded projected screen image produced by a suitable optical system which includes a prism anamorphoser will be lessened if the anamorphoser be mounted so that its optical axial plane makes a small but appreciable angle with the axis of the optical system, the direction of inclination of the optical axial plane being such as to decrease the angle of inclination 33 of the front face of the prism at the expansion or front end of the prism objective to the axis of the optical system. The optimum angle between the two axes required in order to reduce the distortion to a minimum depends upon the degree of distortion resulting from the original construction and upon the magnification. It also depends upon the extent of the angular field of the image in the two directions or diameters. A limitation of the field in one diameter or another or to one side or another of the axis of the optical system will necessarily change the amount of the maximum distortion requiring correction. If the angle between the axes be chosen too large a similar distortion will be introduced on the opposite side of the screen image. In the objectives shown in Figure 3 and in Figure 6, having due regard for the above factors, I have somewhat arbitrarily chosen 5° as a suitable angle. An angle slightly larger or slightly smaller for instance any angle between say 3° and 7° might have been chosen with nearly as satisfactory results for the field in question. But there is an appreciable improvement at 3° for instance as compared with 0°.

The prism anamorphoser as thus described is no longer a straight vision anamorphoser. An axial ray incident on the compression end of the objective described exits from the objective deviated about 2.1° from the axis and in a direction away from the angle of the V of the objective. Because of this change the symmetry of compression with respect to the axis is somewhat disturbed. For many purposes this is not objectionable particularly if the asymmetry is slight. The symmetry of achromatism is markedly disturbed. If the objective of Figure 2 be tipped 5° in the direction above set forth then rays incident on the compression end of the objective and making oppositely directed angles of 6½° with the axis of the optical system have dispersions on exiting from the anamorphoser including that along the axial ray of 0.079°, 0.030°, 0.013°. The last is the dispersion of the ray nearest parallel to the optical axial plane, this plane then lying at the compression end of the objective, within 1½° of this ray. In order to correct the color fringes of such an image the constringence of the glass of the front prism must be considerably increased relative to that of the back prism, about 2 units for each degree of angle between the axis of the optical system and the optical axial plane of the prism anamorphoser. (0.22 unit per degree and 5% of magnification).

In the illustrative example, Figure 3, the constringence, of the front prism 31 is 61.9 and the index of refraction 1.50977. The dispersion along the rays 47, 44, 49 are 0.051°, 0.000°, 0.042° respectively. The dispersion is thus zero along a ray inclined to the axis of the optical system on the expansion side but axial on the compression side. Such a correction makes it perhaps desirable to make use of an image field 71 Figure 6, symmetrically placed with respect to the axis 76 but angularly displaced on the expansion side at 72. The prism anamorphoser of Figure 3 which might by way of example accomplish this result if placed for instance at 74 Figure 6 has the following construction characteristics. The front prism 31 has an apex angle of 14.8° and its front face makes an angle 33 of 42.75° with the axis of the system and an angle 36 of 47.75° with the optical axial plane of the prism anamorphoser. The back prism 32 has an apex angle of 11.9° and its front face makes an angle 35 of 59.1° with the axis of the system and an angle 38 of 54.1° with the optical axial plane of the prism anamorphoser. The glass of prism 32 has been described.

$(\nu = 61.2 \ n_d = 1.5891)$

In practice, for reasons not connected with the necessities of proper correction of the distortion, it has been found convenient to utilize a projected image field 72, in Figure 6, symmetrically placed except for the slight lateral shifting of the image field, with respect to the axis 76 of the system. Under such circumstances the utilized portion of the object field 71 is asymmetrically placed with respect to the axis 76 of the system so long as the prism objective 74 is a non-straight vision prism objective. The reverse arrangement might have been selected and optimum corrections made accordingly. The invention is not limited to the choice of one or the other of such arrangements nor necessarily to the choice of an intermediate arrangement. This asymmetrical use of the image field 71 involves, if the best correction is to be obtained, an adjustment of the color correction so as to secure nearly zero dispersion along a ray inclined to the axis 76 on the compression side but centering on the image 72 and parallel to the axis 77 on the expansion side. The anamorphoser of the illustrative example, Figure 3, gives an angular deviation of an axial ray of about 2.1° on the expansion side. A ray entering axially in the opposite direction is deviated 1.5° on the compression side. It is therefore advisable to shift the correction, as for the objective of Figure 3, to a ray making an angle of 1½° with the axis of the system at the compression end and directed downward toward the V of the prism objective. As above disclosed this may be done, for instance by decreasing the constringence or Abbe number $\nu$ of the front prism approximately 3 units; in this case from 61.9 to 58.9.

The equilateral prism anamorphoser 74 of Figure 6 is so corrected. Its optical axial plane is inclined 5° to the axis 76 of the optical system:

|  | Apex angle | Angle between front face and axis of the optical system | Angle between front face and optical axial plane |
|---|---|---|---|
| Prism 78 | 14.6° | 42.9° | 47.9° |
| Prism 79 | 11.9° | 59.1° | 54.1° |

Prism 78 glass $n_d$ 1.51823, $\nu$ 59.0.
Prism 79 glass $n_d$ 1.5891, $\nu$ 61.2.

The back prism as the same orientation and is the same as the back prism of the prism objective of Figure 3. The dispersions along rays inclined at the compression end 6½° to each side of the 1½° inclined axis of the image field together with that along this 1½° inclined ray are 0.050°, 0.000, 0.044°. The dispersions at the margins of the image are therefore substantially equal with no dispersion at the center.

Having reference to Figs. 4 and 5 and Fig. 6, broadly considered, I have discovered that an approximately 5° tip of the optical axial plane of the prism anamorphoser will shift the plane of rectilinear reproduction from about 6° below to about 1½° above the center of the image field 71, Fig. 6, (center equals intersection with the axis 76), in other words shift the plane of rectilinear reproduction roughly 7½°. As stated, about half this much shift or half again this much shift will considerably improve the rectilinear character of the reproduction as a whole in the case of an image field of the angular extent here illustrated. Thus if the image field 71 utilized were symmetrical with respect to the axis 76 on the compression side instead of on the expansion side as illustrated, the necessary tip would be approximately 4° and the lower limit of suitable tipping range would be correspondingly reduced, namely to 2° instead of 3°. Similarly the same result is accomplished if the optical axial plane of the anamorphoser be not tipped and the image field be shifted so as to center it on the plane of rectilinear reproduction. This is not practical in the case of image fields of the angular extent here illustrated because wide aperture projection or photographic objectives will not cover a sufficient extent of field for this purpose, but a combination of tipping and shifting might be used with propriety. In either case distortionless reproduction of the character described is obtained when the optical axial plane of the prism anamorphoser makes an angle of aproximately the magnitude first described with the axis of rectilinear reproduction, this axis for reference purposes being one preferably passing through the center of the image field on the compression side.

The amount of tipping of the optical axial plane of the anamorphosing prism objective necessary to substantially correct pillow case distortion is proportionate to the magnification produced by the anamorphoser. For small magnifications it is proportionately less than the amounts stated for the 45% magnifications of the illustrative examples.

The prism systems so far illustrated are composed of what might be termed medium strength prisms. If, while maintaining the same magnification, both prisms are made very considerably stronger the pillow case distortion is increased and, in the straight vision equilateral position, all of the lines 53, 52 and 51 of Fig. 4 bend appreciably in the direction indicated for the curved lines 51. Appreciably decreasing the strength of both prisms tips the prisms at more acute angles to the axis, but does not materially affect the distortion.

It has been disclosed that tipping the optical axial plane of a prism anamorphoser about 5° more or less to a certain side of the axis of an optical system or image field will greatly improve the pillow case distortion of the image. So far we have illustrated this tipping making use of equilateral straight vision prism anamorphosers so that in the tipped position they were no longer equilateral with respect to the general axis, the axis of the system as a whole.

I have discovered that the equilateral property with respect to the general axis can be retained and tipping of the optical axial plane with its resultant advantages accomplished by what might be called an "optical tipping" of this plane. In fact I have discovered that it is the position of the optical axial plane which is of fundamental importance, both for correction of distortion and the correction of achromatism by cross achromatization using simple prisms.

A suitable "optical tipping" of the axial plane with respect to an equilateral axis can, I have discovered, be accomplished by making the front prism relatively appreciably stronger than the back prism and placing the front face of the front prism at a greater angle to the optical axial plane than the angle between the front face of the back prism and the optical axial plane.

Instead of being not more than 25% stronger as in the case of equilateral straight vision prism anamorphoser, the front prism must be from 30 to 80% stronger than the back prism, relatively stronger as the angle between the optical axial plane and the equilateral axis is greater. The range is not outside 45% to 65% for suitable prism sets with optical axial planes tipped 5° to the equilateral axis (the magnification of 45% remaining constant).

The relative magnitudes of the angles of inclination of the front faces of the two prisms to the optical axial plane are for suitable tipping of the optical axial plane, reversed from the relationship obtaining for straight vision equilateral prism anamorphosers. The angle of inclination of the front face of the back prism to the optical axial plane may be as much as 16° less than that of the front face of the front prism to this plane. The angles between these faces and the equilateral axis become more nearly equal than before, in fact often differing very little from each other.

For medium strength prisms, and always for magnifications of about 45%, achromatism along the optical axial plane of optically tipped sets is obtained when the $\nu$ difference is approximately nine units as before. Strictly speaking the $\nu$ difference decreases somewhat, about ¼ unit for each degree of optical tipping. In the case of the weaker prism set just considered this decrease in the $\nu$ difference with tipping is more nearly ¾ unit for each degree of tipping.

For all of these anamorphosers the increment of chromatic dispersion per degree variation in the angle of inclination of a ray at the compression end is, as heretofore stated for the equilateral straight vision anamorphosers, 0.00075° per 5% of magnification of the anamorphoser. For these anamorphosers magnifying 45% the decrease in $\nu$ difference from the optimum for achromatization along the optical axial plane in order to obtain achromatization along some other ray amounts to approximately 2 units per degree inclination of the said ray at the compression end to the optical axial plane (inclination being taken in the direction of the equilateral axis). Thus the $\nu$ of the glass of the back prism for achromatization along the equilateral axis and for a 5° tipping of the optical axial plane becomes equal or less than that of the glass of the front prism. It may be as much as six or eight units less.

By way of illustration, Fig. 7 is an anamorphosing prism objective corrected for distortion in the manner described being equilateral with respect to the general axis of the system and having its optical axial plane tipped about 5° to be exact 5¼°, with respect to this axis in such a direction as to make the angle of inclination of the front face of the front prism to the optical axial plane greater than its angle of inclination to the general axis of the system. This prism anamorphoser is achromatic along a ray parallel to the general axis on the expansion side of the anamorphoser. When used to replace the prism anamorphoser 74 of Figure 6, it gives a screen image at 72 of the character shown in Figure 8, the lines 91 and 93 being equispaced and approximately equicurved and equidistant from the center ones 92. They are straighter than the lines 51 of Figure 4. If this prism anamorphoser were used in an optical system having shifted image fields it would have to be correspondingly tipped.

The prism anamorphoser illustrated in Figure 7 has the same magnification (about 45%) as the anamorphosers previously illustrated. Its back prism 82 has a minimum deviation angle of 4.618°. It is about ⅓ weaker than the back prisms of the other anamorphosers illustrated. This choice of a weaker prism is merely by way of illustration, there being as discussed above, a considerable range of strengths for which suitable anamorphosers may be constructed.

The construction data for the anamorphoser illustrated in Figure 7 are as follows:

|  | Apex angle | Strength | Angle between front face and axis of the optical system | Angle between front face and optical plane |
| --- | --- | --- | --- | --- |
| Prism 81 | 13.85° | 7.1° | 47.5° | 52.75° |
| Prism 82 | 9.00° | 4.6° | 48.0° | 42.75° |

Prism 81 glass $n_d$ 1.51053, $\nu$64.0
Prism 82 glass $n_d$ 1.51112, $\nu$60.5

The dispersions C to F along the rays 97, 104, 99 of Fig. 7 (compression end 6.5° up from angularly displaced center ray, center ray axial expansion side, 6.462° down from angularly displaced center ray, equal intercepts on the image plane 71, Fig. 6) are 0.043°, 0.001°, 0.051° respectively. On the expansion side these rays make angles of 9.343° and 9.340° respectively with the axial ray. The linear magnification is 44.7%.

The above improvements in the prism anamorphoser result in a nearly rectilinear reproduction of an object throughout a field of the extent described, provided of course that the image is not distorted by other elements of the optical system. For example, certain otherwise satisfactory projection lenses give marked pillow case distortion of the image. The spherical correcting lens 75 of Figure 6 introduces a certain amount of distortion.

The spherical correcting lens illustrated in Figure 6 at 75 has a focal length approximately equal to its distance from the image (or object) plane 72. Such a lens causes paraxial pencils from points in the plane 72 to be pencils of parallel light while traversing the prism anamorphoser and hence obviates the introduction of the astigmatism in such pencils which would result from the refraction of convergent pencils at the inclined plane surfaces of the prisms.

The foregoing particulars described are illustrative merely and not intended as defining the limits of the invention.

I claim:

1. An anamorphosing prism objective comprising a pair of prisms of different strengths having their bases oppositely arranged and in the form of a V, the stronger prism being at the front or expansion end of the objective and having its front face inclined to the optical axial plane of the objective at a predetermined angle in one direction, the weaker or back prism having its front face inclined to the optical axial plane of the objective at an angle in the other direction, the prism objective being mounted with the optical axial plane inclined to the axis of the mounting in a direction such that the angle between the optical axial plane and the front face of the front prism is greater than the angle between the axis of the mounting and said front face whereby marginal pillow case distortion at one margin of the projected image is reduced, substantially as described.

2. An anamorphosing prism objective comprising a pair of prisms of different strengths having their bases oppositely arranged and in the form of a V, the stronger prism being at the front or expansion end of the objective and having its front face inclined to the optical axial plane of the objective at a predetermined angle in one direction, the weaker or back prism having its front face inclined to the optical axial plane of the objective at an angle in the other direction, the prism objective being mounted with the optical axial plane inclined to the axis of the mounting of the objective at an angle approximating 3 to 7° in a direction such that the angle between the optical axial plane and the front face of the front prism is greater than the angle between the axis of the mounting and said front face, substantially as described.

3. An anamorphosing prism objective comprising a pair of prisms of different strengths having their bases oppositely arranged, the stronger prism being at the front or expansion end of the objective and having its front face inclined to the optical axial plane of the objective at a predetermined angle in one direction, the weaker or back prism having its front face inclined to the optical axial plane of the objective at an angle less than or less than 12° greater in the other direction, the prism objective being mounted with the optical axial plane inclined to the axis of the mounting of the objective at an angle approximating 5° in a direction such that the angle between the optical axial plane and the front face of the front prism is greater than the angle between the axis of the mounting and said front face, substantially as described.

4. An anamorphosing prism objective comprising a pair of prisms of different strengths having their bases oppositely arranged, the stronger prism being at the front or expansion end of the objective and having its front face inclined to the optical axial plane of the objective at a predetermined angle in one direction, the weaker or back prism having its front face inclined to the optical axial plane of the objective at an angle not more than 16° different in the other direction, the prism objective being mounted with the optical axial plane inclined to the axis of the mounting of the objective at an angle approximating 3 to 7° in a direction such that the angle between the optical axial plane and the front face of the front prism is greater than the angle between the axis of the mounting and said front face, substantially as described.

5. An anamorphosing prism objective of the character described for use with an image producing system, comprising a pair of prisms of different strengths having their bases oppositely arranged, the stronger prism being at the front or expansion end of the objective and having its front face inclined to the optical axial plane of the objective at a predetermined angle in one direction, the weaker or back prism having its front face inclined to the optical axial plane of the objective at an angle between 2° less and 9° greater, in the other direction, the strength of the stronger prism being greater but less than 25% greater than that of the weaker prism, the pair of prisms being mounted with the optical axial plane of the objective inclined to the axis of the mounting of the objective at an angle approximating 5° whereby the bending of the images of straight lines symmetrically situated in a focal plane of and on opposite sides of an axial plane of the image producing system and oriented at right angles to the active plane of the prism objective is substantially equalized, substantially as described.

6. An anamorphosing prism objective of the character described, comprising a pair of prisms of different strengths having their bases oppositely arranged, the weaker prism being at the back or compression end of the objective and having its front face inclined to the optical axial plane of the objective at a predetermined angle in one direction, the stronger or front prism having its front face inclined to the optical axial plane of the objective at a greater angle in the other direction, the strength of the stronger prism being 30 to 80% greater than that of the weaker prism, the pair of prisms being mounted with the optical axial plane of the objective inclined to the axis of the mounting of the objective at an angle of 3 to 7° substantially as described.

7. An equilateral anamorphosing prism objective of the character described, comprising a pair of prisms of different strengths having their bases oppositely arranged, the weaker prism being at the back or compression end of the objective and having its front face inclined to the optical axial plane of the objective at a predetermined angle in one direction, the stronger or front prism having its front face inclined to the optical axial plane of the objective at an angle greater, but less than 16° greater, in the other direction, the strength of the stronger prism being 45 to 65% greater than that of the weaker prism, the pair of prisms being mounted with the optical axial plane of the objective inclined to the axis of the mounting of the objective at an angle of approximately 5° substantially as described.

8. An anamorphosing prism objective of the character described, comprising a pair of prisms of different strengths having their bases oppositely arranged, the weaker prism being at the back or compression end of the objective and having its front face inclined to the optical axial plane of the objective at a predetermined angle in one direction, the strength of the stronger or front prism being greater than but less than twice that of the back prism, the front prism having its front face inclined to the optical axial plane of the objective in the other direction at an angle between 12° less and 16° greater than the first mentioned angle, this angle of inclination of the front prism being relatively proportionately greater than that of the back prism as the strength of the front prism is proportionately greater than that of the back prism within the limits indicated, the pair of prisms being mounted with the optical axial plane of the objective at an angle of 3 to 7° to the axis of the mounting, substantially as described.

9. An achromatic anamorphosing prism objective of the character described comprising a pair of prisms of different strengths having their bases oppositely arranged, the stronger prism being at the front or expansion end of the objective and having its front face inclined to the optical axial plane of the objective at a predetermined angle in one direction, the weaker or back prism having its front face inclined to the optical axial plane of the objective at an angle less than or not more than 12° greater in the other direction, the constringence or Abbe numbers of the glasses of the two prisms differing by not more than six units and providing a substantial achromatization of the objective for rays parallel to the mounting of the objective at one end of the objective, the prism objective being mounted with its optical axial plane inclined to the axis of the mounting at an angle approximating 5° in a direction such that the angle between the optical axial plane and the front face of the front prism is greater than the angle between the axis of the mounting and said front face, substantially as described.

10. An anamorphosing prism objective comprising two prisms of different strengths having their bases oppositely arranged and their front faces oppositely inclined to the optical axial plane of the objective, the stronger prism being at the front or expansion end of the objective, the angle of inclination of the front face of the weaker or back prism to the optical axial plane of the objective being less than or less than 12° greater than the angle of inclination of the front face of the stronger prism to the optical axial plane, said objective being mounted with the optical axial plane of the objective inclined to the axis of the mounting of the objective at an angle approximating 3 to 7° in a direction such that the angle between the optical axial plane and the front face of the front prism is greater than the angle between the axis of the mounting and said front face, substantially as described.

11. An anamorphosing prism objective comprising two prisms of different strengths having their bases oppositely arranged and their front faces oppositely inclined to the optical axial plane of the objective, the stronger prism being at the front or expansion end of the objective, the angle of inclination of the front face of the weaker or back prism to the optical axial plane of the objective being less than or less than 9° greater than the angle of inclination of the front face of the stronger prism to the optical axial plane, said objective being mounted with the optical axial plane of the objective inclined to the axis of the mounting of the objective at an angle approximating 5° in a direction such that the angle between the optical axial plane and the front face of the front prism is greater than the angle between the axis of the mounting and said front face, substantially as described.

12. An achromatic anamorphosing prism objective comprising two prisms of different strengths having their bases oppositely arranged and their front faces oppositely inclined to the optical axial plane of the objective, the stronger prism being at the front or expansion end of the objective, the angle of inclination of the front face of the weaker or back prism to the optical axial plane of the objective being less than or less than 12° greater than the angle inclination of the front face of the stronger prism to the optical axial plane, the constringence or Abbe numbers of the glasses of the two prisms differing by less than nine units, said prisms being mounted with the optical axial plane of the objective inclined to the axis of the mounting of the objective at an angle approximating 3 to 7° in a direction such that the angle between the optical axial plane and the front face of the front prism is greater than the angle between the axis of the mounting and the said front face, substantially as described.

13. An achromatic anamorphosing prism objective comprising two prisms of different strengths having their bases oppositely arranged and their front faces oppositely inclined to the optical axial plane of the objective, the stronger prism being at the front or expansion end of the objective, the angle of inclination of the front face of the weaker back prism to the optical axial plane of the objective being less than or less than 12° greater than the angle of inclination of the front face of the stronger prism to the optical axial plane, the constringence or Abbe numbers of the glasses of the two prisms differing by not more than eight units and providing a substantial achromatization of the objective for rays parallel to the mounting of the objective at one end of the objective, the prism objective being mounted with its optical axial plane inclined to the axis of the mounting at an angle approximating 5° in a direction such that the angle between the optical axial plane and the front face of the front prism is greater than the angle between the axis of the mounting and said front face, substantially as described.

14. An anamorphosing prism objective comprising two prisms of different strengths having their bases oppositely arranged, the prism at the expansion or front end of the objective being the stronger and having its front face inclined to the optical axial plane of the objective at a predetermined angle in one direction, the back or weaker prism having its front face inclined to the optical axial plane of the objective in the opposite direction and at an angle less than or less than 12° greater than the first mentioned angle, the front prism being stronger than the back prism whereby the angular deviation of pencils incident on the objective at its compression end and inclined at equal angles but in opposite directions to the optical axial plane, is substantially equal, but opposite in direction, and the optical axial plane of the objective being inclined to the axis of the mounting of the objective at an angle of between 3 and 7° whereby the bending of the images of straight lines oriented at right angles to the active plane of the objective is substantially avoided, substantially as described.

15. An anamorphosing prism objective comprising two prisms of different strengths having their bases oppositely arranged, the prism at the expansion or front end of the objective being the stronger and having its front face inclined to the axis of the mounting of the objective at a predetermined angle in one direction, the back or weaker prism having its front face inclined to the axis of the mounting of the objective in the opposite direction and at an angle not more than six degrees different than the first mentioned angle, the front prism being at least 30% stronger than the back prism whereby the angular deviation of pencils incident on the objective at its compression end and inclined at equal angles but in opposite directions to the axis of the mounting is substantially equal but opposite in direction, and the optical axial plane of the objective being inclined to the axis of the mounting of the objective at an angle of between 3 and 7° whereby the bending of the images of straight lines oriented at right angles to the active plane of the objective is substantially avoided, substantially as described.

16. An equilateral anamorphosing prism objective comprising two prisms of different strengths having their bases oppositely arranged, the prism at the expansion or front end of the objective being the stronger and having its front face inclined to the axis of the mounting at a predetermined angle in one direction, the back or weaker prism having its front face inclined to the axis of the mounting in the opposite direction at a substantially equal angle, the front prism being about 50% stronger than the back prism, whereby pencils incident on the objective at its compression end and inclined at equal angles but in opposite directions to the axis of the mounting will emerge at the expansion end at angles substantially equal but opposite in direction to the emerging ray at the expansion end which is incident parallel to the axis at the compression end, and the optical axial plane of the objective being inclined to the axis of the mounting of the objective at an angle of about 5° whereby the bending of the images of straight lines oriented at right angles to the active plane of the objective is substantially avoided, substantially as described.

17. An achromatic anamorphosing prism objective comprising two prisms of different strengths having their bases oppositely arranged, the prism at the expansion or front end of the objective being the stronger and having its front face inclined to the optical axial plane of the objective at a predetermined angle in one direction, the back or weaker prism having its front face inclined to the optical axial plane of the objective in the opposite direction and at an angle greater but less than 12° greater than the first mentioned angle, the front prism being stronger than the back prism whereby the angular deviation of pencils incident on the objective at its compression end and inclined at equal angles but in opposite directions to the optical axial plane is substantially equal but opposite in direction, the optical axial plane of the objective being inclined to the axis of the mounting of the objective at an angle of between 3 and 7° whereby the bending of images of straight lines oriented at right angles to the active plane of the objective is substantially avoided, the Abbe numbers of the glasses of the two prisms being approximately equal, substantially as described.

18. An achromatic anamorphosing prism objective comprising two prisms of different strengths having their bases oppositely arranged, the prism at the expansion or front end of the objective being the stronger and having its front face inclined to the optical axial plane of the objective at a predetermined angle in one direction, the back or weaker prism having its front face inclined to the optical axial plane of the objective in the opposite direction and at an angle greater but less than 12° greater than the first mentioned angle, the front prism being stronger than the back prism whereby the angular deviation of pencils incident on the objective at its compression end and inclined at equal angles but in opposite directions to the optical axial plane is substantially equal but opposite in direction, the optical axial plane of the objective being inclined to the axis of the mounting of the objective at an angle of between 3 and 7° whereby the bending of images of straight lines oriented at right angles to the active plane of the objective is substantially avoided, the Abbe number of the glass of the front prism being approximately equal to or not more than six units less than that of the glass of the back prism, substantially as described.

19. An achromatic anamorphosing prism objective comprising two prisms of different strengths having their bases oppositely arranged, the prism at the expansion or front end of the objective being the stronger and having its front face inclined to the optical axial plane of the objective at a predetermined angle in one direction, the back or weaker prism having its front face inclined to the optical axial plane of the objective in the opposite direction and at an angle less than or less than 12° greater than the first mentioned angle, the optical axial plane of the objective being inclined to the axis of the mounting of the objective at an angle approximating 3 to 7° in a direction such that the angle between the optical axial plane and the front face of the front prism is greater than the angle between the axis of the mounting and said front face, the constringence or Abbe number of the glass of the front prism being less than the constringence or Abbe number of the glass of the back prism by a number of units equal to nine minus 1 to 3 times the number of degrees in the angle between the optical axial plane and the axis of the mounting, substantially as described.

20. An achromatic straight vision anamorphosing prism objective comprising two prisms of different strengths having their bases oppositely arranged, the prism at the expansion or front end of the objective being the stronger and having its front face inclined to the optical axial plane of the objective at a predetermined angle in one direction, the back or weaker prism having its front face inclined to the optical axial plane of the objective in the opposite direction and at an angle greater but less than 12° greater than the first mentioned angle, the constringence or Abbe number of the glass of the front prism being at least four and not more than fourteen units less than that of the glass of the back prism.

21. An achromatic straight vision anamorphosing prism objective comprising two prisms of different strengths having their bases oppositely arranged, the prism at the expansion or front end of the objective being the stronger and having its front face inclined to the optical axial plane of the objective at a predetermined angle in one direction, the other or back or weaker prism having its front face inclined to the optical axial plane of the objective in the opposite direction and at an angle greater but less than 9° greater than the first mentioned angle, the constringence or Abbe number of the glass of the front prism being approximately nine units less than that of the glass of the back prism.

22. An achromatic anamorphosing prism objective comprising two separately achromatized prisms of different strengths having their bases oppositely arranged, the prism at the expansion or front end of the objective being the stronger and having its front face inclined to the optical axial plane of the objective at a predetermined angle in one direction, the back or weaker prism having its front face inclined to the optical axial plane of the objective in the opposite direction and at an angle greater but less than 9° greater than the first mentioned angle, each prism composed of a crown glass element and a flint glass element cemented together, the flint glass element in each case being on the side exterior to the objective thereby to improve the achromatization of the objective as a whole for obliquely incident rays.

23. An achromatic anamorphosing prism objective comprising two prisms of different strengths having their bases oppositely arranged, the prism at the expansion or front end of the objective being the stronger and having its front face inclined to the optical axial plane of the objective at a predetermined angle in one direction, the back or weaker prism having its front face inclined to the optical axial plane of the objective in the opposite direction and at an angle greater but less than 9° greater than the first mentioned angle, the back prism composed of a heavy crown glass of an index of refraction greater than 1.58 and a constringence or Abbe number greater than 58.

24. An achromatic anamorphosing prism objective consisting of two oppositely arranged simple prisms of substantially the following materials, dimensions, and arrangement, the stronger or front prism having an apex angle of 14.8° and composed of glass with an index of refraction for the $d$ line of 1.50977 and constringence or Abbe number of 61.9, said prism being mounted with its front face at an angle of 42.75° to the axis of the objective, the other or back prism having an apex angle of 11.9° and composed of a glass with an index of refraction for the $d$ line of 1.5891 and a constringence or Abbe number of 61.2, said prism being mounted with its front face at an angle of 59.1° to the axis of the objective.

25. An achromatic anamorphosing prism objective consisting of two oppositely arranged simple prisms of substantially the following materials, dimensions, and arrangement, the stronger or front prism having an apex angle of 14.6° and composed of glass with an index of refraction for the $d$ line of 1.51823 and constringence or Abbe number of 59.0, said prism being mounted with its front face at an angle of 42.90° to the axis of the objective, the other or back prism having an apex angle of 11.9° and composed of a glass with an index of refraction for the $d$ line of 1.5891 and a constringence or Abbe number of 61.2, said prism being mounted with its front face at an angle of 59.1° to the axis of the objective.

26. An achromatic anamorphosing prism objective consisting of two oppositely arranged simple prisms of substantially the following materials, dimensions, and arrangement, the stronger or front prism having an apex angle of 13.85° and composed of glass with an index of refraction for the $d$ line of 1.51053 and constringence or Abbe number of 64.0, said prism being mounted with its front face at an angle of 47.5° to the axis of the objective, the other or back prism having an apex angle of 9° and composed of a glass with an index of refraction for the $d$ line of 1.51112 and a constringence or Abbe number of 60.5, said prism being mounted with its front face at an angle of 48° to the axis of the objective.

27. An anamorphosing prism objective comprising a pair of prisms of different strengths having their bases oppositely arranged and in the form of a V, the stronger prism being at the front or expansion end of the objective and having its front face inclined to the optical axial plane of the objective at a predetermined angle in one direction, the weaker or back prism having its front face inclined to the optical axial plane of the objective at an angle in the other direction, the optical axial plane being inclined approximately 2 to 9° to the equilateral axis of the objective in a direction such that the angle between the optical axial plane and the front face of the front prism is greater than the angle between the equilateral axis and said front face, whereby marginal pillow case distortion at one margin of the projected image is reduced, substantially as described.

In testimony whereof I have affixed my signature to this specification.

HARRY SIDNEY NEWCOMER.